United States Patent
Yang

(10) Patent No.: US 10,851,828 B2
(45) Date of Patent: Dec. 1, 2020

(54) FIXING DEVICE AND MOBILE PHONE HOLDER

(71) Applicant: KingQue Technology (Shenzhen) Co., Ltd., Guangdong (CN)

(72) Inventor: Wenmiao Yang, Guangdong (CN)

(73) Assignee: Kingque Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/384,909

(22) Filed: Apr. 15, 2019

(65) Prior Publication Data

US 2020/0072275 A1 Mar. 5, 2020

(30) Foreign Application Priority Data

Sep. 4, 2018 (CN) .......................... 2018 1 1024209

(51) Int. Cl.
*F16B 47/00* (2006.01)
*F16M 13/02* (2006.01)
*H04M 1/04* (2006.01)

(52) U.S. Cl.
CPC ........... *F16B 47/00* (2013.01); *F16M 13/022* (2013.01); *H04M 1/04* (2013.01)

(58) Field of Classification Search
CPC ..... F16B 47/00; F16B 47/006; F16M 13/022; H04M 1/04; B60R 2011/0056; B60R 2011/0058; A47G 1/17
USPC .......... 248/205.5, 205.8, 205.9, 206.2, 206.3
See application file for complete search history.

(56) References Cited

U.S. PATENT DOCUMENTS

| 3,602,543 | A | * | 8/1971 | Sjodin | B66C 1/0212 294/189 |
|---|---|---|---|---|---|
| 4,126,126 | A | * | 11/1978 | Bare | A61B 5/0408 600/392 |
| 4,221,356 | A | * | 9/1980 | Fortune | B25B 11/005 248/363 |
| 8,096,537 | B2 | * | 1/2012 | Browne | F16B 47/00 248/205.5 |
| 8,480,044 | B2 | * | 7/2013 | Liao | F16B 47/00 248/205.5 |
| 9,057,398 | B2 | * | 6/2015 | Yang | F16B 47/006 |
| 2014/0197288 | A1 | * | 7/2014 | Yang | F16B 47/006 248/205.9 |
| 2014/0263894 | A1 | * | 9/2014 | Chen | F16B 47/00 248/205.9 |
| 2015/0330438 | A1 | * | 11/2015 | Shi | A47K 10/14 248/205.8 |
| 2016/0025264 | A1 | * | 1/2016 | Casagrande | F16M 11/14 248/205.9 |
| 2016/0331163 | A1 | * | 11/2016 | Handerhan | A47G 19/10 |
| 2018/0209412 | A1 | * | 7/2018 | Wei | F04B 43/095 |
| 2019/0063488 | A1 | * | 2/2019 | Becker | E05B 73/00 |

* cited by examiner

*Primary Examiner* — Nkeisha Smith

(57) ABSTRACT

A fixing device and a mobile phone holder are disclosed. Wherein, the fixing device includes: a suction cup; an air pump connected to the suction cup for pumping air and forming a negative pressure at the suction cup to adsorb and fix an object to be fixed. The fixing device uses the air pump to suck the air in the suction cup, so as to firmly fix the object to be fixed and the suction cup together, preventing the object to be fixed from falling off, thereby improving the stability and reliability of the fixing device.

6 Claims, 3 Drawing Sheets

FIXING DEVICE AND MOBILE PHONE HOLDER

CROSS REFERENCE TO RELATED APPLICATION

The present application claims the priority of Chinese application with application No. CN201811024209.6 and filed on Sep. 4, 2018. The contents of CN201811024209.6 are all hereby incorporated by reference.

FIELD OF THE INVENTION

The present application relates to the technical field of fixing device, and more particularly, to a fixing device and a mobile phone holder.

BACKGROUND OF THE INVENTION

With the development of the fixed holder technology, the application field and the scene of the fixed holder are more and more widely, and the user's requirements for the fixed holder are getting higher and higher, especially for the mobile phone holder. Traditional mobile phone holder is a flat structure design or an inclined holder structure design, and the user could place the mobile phone on the corresponding holder, so for the user to use. However, when the scene that the user uses the holder is more complicated, for example, in a moving car, it will cause the mobile phone to fall off from the mobile phone holder, affecting the user experience.

In the traditional technology, in order to prevent the mobile phone from falling off from the mobile phone holder, the mobile phone is usually fixed on the mobile phone holder by means of a magnet sucking the mobile phone. However, this manner has a low stability and reliability for the fixing of the mobile phone, resulting in a poor user experience. In addition, the mobile phone holder does not have a wireless charging function.

SUMMARY OF THE INVENTION

For solving at least one of the above technical problems, the present application provides a fixing device and a mobile phone holder which could effectively fix an object to be fixed.

For achieving the above objective, a technical solution adopted by the present application is: a fixing device is provided, comprising:

a suction cup;

an air pump, connected to the suction cup, for pumping air and forming a negative pressure at the suction cup to adsorb and fix an object to be fixed, wherein the object to be fixed is an electronic product.

In one embodiment, the fixing device further comprises:

a housing, and the air pump is fixedly installed in the housing; the suction cup is disposed outside the housing, and the suction cup is connected to the air pump through an air guiding tube.

In one embodiment, the air pump is a miniature piezoelectric pump.

In one embodiment, the suction cup is a soft glue suction cup.

In one embodiment, the suction cup is composed of a funnel-shaped member and an annular-shaped member surrounding the outside of the funnel shaped member, and the suction cup is fixed to an outside of the housing through a suction cup cover plate.

In one embodiment, the suction cup cover plate is provided with a soft glue non-slip mat for increasing a friction between the suction cup and the object to be fixed, and the soft glue non-slip mat is provided with a single guiding pattern.

For achieving the above objective, another technical solution adopted by the present application is: a mobile phone holder is provided, which comprises any one of the above fixing device.

In one embodiment, the mobile phone holder further comprises:

a charging circuit board, the charging circuit board is disposed in the housing, and the charging circuit board is provided with a USB interface, and the USB interface extends to the outside of the housing;

a wireless charging transmitting coil, the wireless charging transmitting coil is disposed at one side of the housing and electrically connected to the charging circuit board;

a magnetic conductive piece, the magnetic conductive piece is disposed between the charging circuit board and the wireless charging transmitting coil.

In one embodiment, the outside of the housing is further provided with an indicating light-guide ring, and the indicating light-guide ring is electrically connected to the charging circuit board for indicating the current working state of the mobile phone holder.

In one embodiment, an opening of the suction cup is provided with a dustproof net for filtering the inhaled air;

the housing is further provided with a cylindrical protrusion, and a fastening nut is sleeved on the cylindrical protrusion, and the fastening nut is in threaded connection with the cylindrical protrusion, which could fix the mobile phone holder.

The fixing device in the technical solutions of the present application comprises: a suction cap; an air pump, connected to the suction cup for pumping air and forming a negative pressure at the suction cup to adsorb and fix the object to be fixed. The fixing device uses the air pump to suck the air in the suction cup, so as to firmly fix the object to be fixed and the suction cup together, preventing the object to be fixed from falling off, thereby improving the stability and reliability of the fixing device.

The mobile phone holder in the technical solutions of the present application comprises the above fixing device. The mobile phone holder uses the air pump to suck the air in the suction cup, so as to firmly fix the mobile phone and the suction cup together, preventing the mobile phone from falling off from the holder, thereby improving the stability and reliability of the mobile phone holder.

Figure 1:
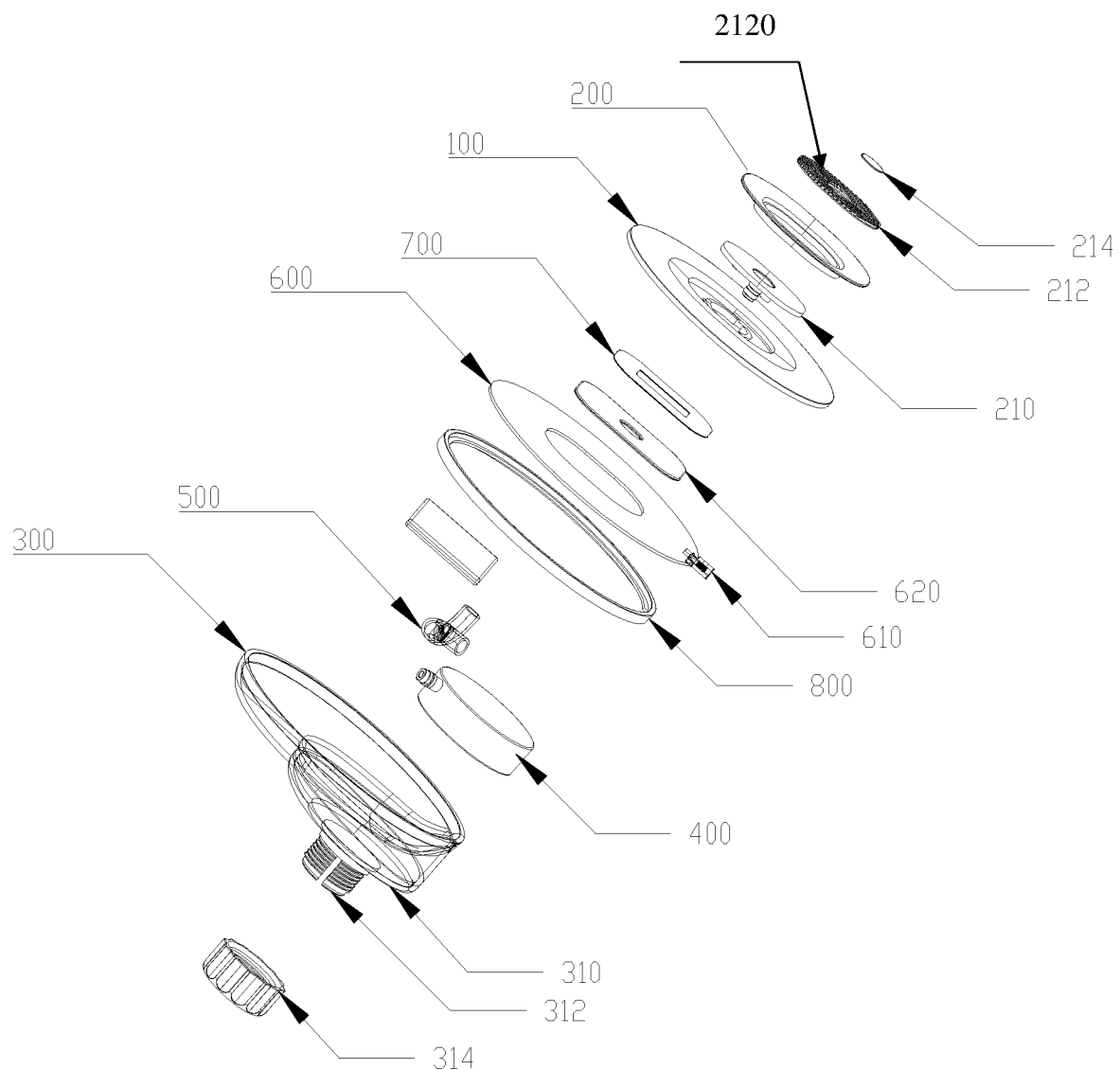
FIG. 1 is an exploded diagram of a fixing device according to an embodiment of the present application.

Reference numerals: 100—panel; 200—soft glue suction cup; 210—suction cup cover plate; 212—soft glue non-slip mat; 214—dustproof net; 300—first housing; 310—second housing; 312—cylindrical protrusion; 314—fastening nut; 400—air pump; 500—air guiding tube; 600—charging circuit board; 610—USB interface; 620—magnetic conductive piece; 700—wireless charging transmitting coil; 800—indicating light-guide ring.

The implementation of objectives, functional features and advantages of the present application will be further described in conjunction with the embodiments and with reference to the accompanying drawings.

DESCRIPTION OF THE EMBODIMENTS

The technical solutions in the embodiments of the present application are clearly and completely described in the following with reference to the accompanying drawings in the embodiments of the present application, obviously, the described embodiments are a part of the embodiments of the present application, and not all of the embodiments. All other embodiments obtained by person skilled in the art based on the embodiments of the present application without creative work fall into the protection scope of the present application.

It should be noted that, the descriptions of the "first", "second" and the like in the present application are only for the purpose of description, and are not to be construed as indicating or implying their relative importance or implicitly indicating the number of the defined technical features. Thus, the features defined by the "first", "second" may explicitly or implicitly comprise at least one of the features. In addition, the technical solutions between the various embodiments may be combined with each other, but the combination must be based on the implementation of person skilled in the art, and when the combination of the technical solutions is contradictory or impossible to implement, it should be considered that the combination of the technical solutions does not exist and does not fall into the protection scope claimed by the present application. The main object of the present application is to provide a suction-cup type mobile phone holder that could effectively fix a mobile phone.

In the traditional technology, traditional mobile phone holder is a flat structure design or an inclined holder structure design, and the user could place the mobile phone on the corresponding holder, so for the user to use. However, when the scene that the user uses the holder is more complicated, for example, in a moving car, it will cause the mobile phone to fall off from the mobile phone holder, affecting the user experience. In the traditional technology, in order to prevent the mobile phone from falling off from the mobile phone holder, the mobile phone is usually fixed to the mobile phone holder by means of a magnet sucking the mobile phone. However, this manner has a low stability and reliability for the fixing of the mobile phone, resulting in a poor user experience.

Figure 2:
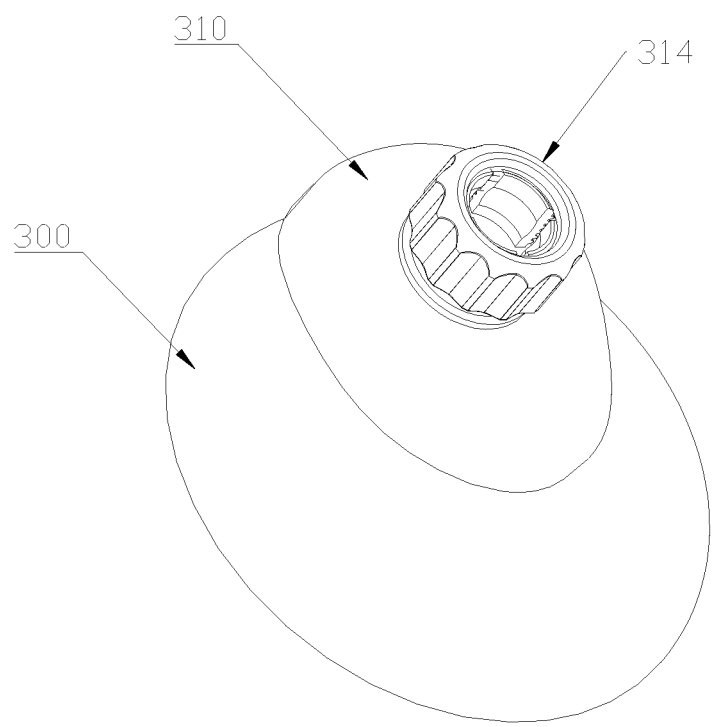
FIG. 2 is a schematic diagram of overall structure of a fixing device according to an embodiment of the present application.
Figure 3:
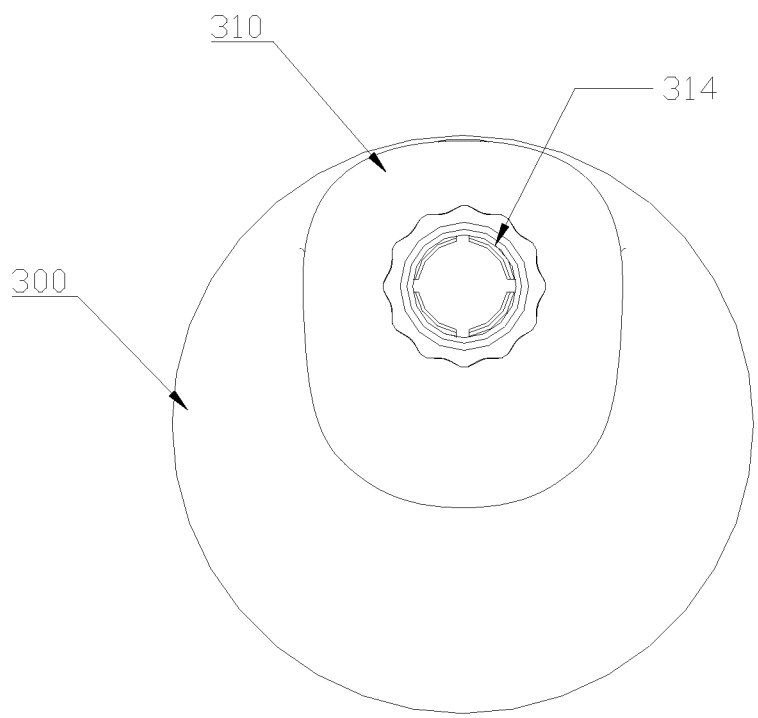
FIG. 3 is a front view of a fixing device according to an embodiment of the present application.
Figure 4:
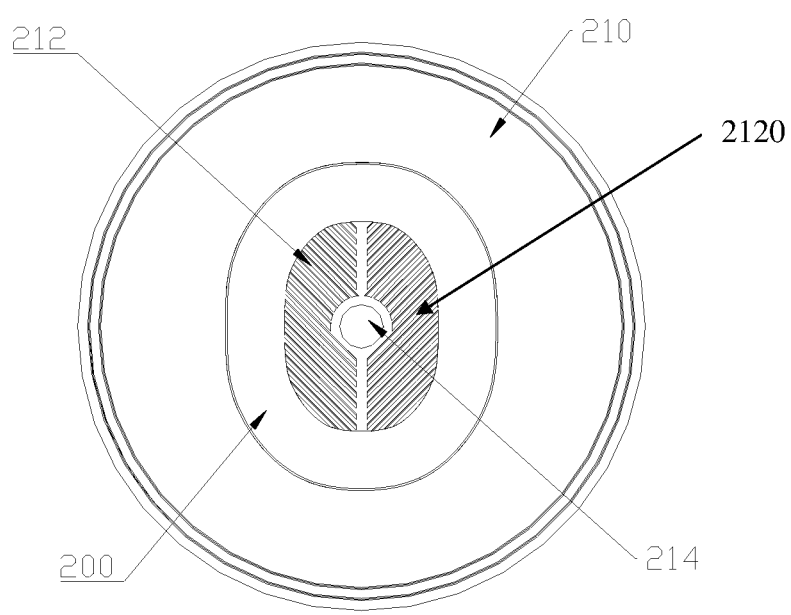
FIG. 4 is a rear view of a fixing device according to an embodiment of the present application.

Referring to the FIG. 1-4, FIG. 1 is an exploded diagram of a fixing device according to an embodiment of the present application; FIG. 2 is a schematic diagram of overall structure of a fixing device according to an embodiment of the present application; FIG. 3 is a front view of a fixing device according to an embodiment of the present application; FIG. 4 is a rear view of a fixing device according to an embodiment of the present application. The present embodiment provides a fixing device, and the fixing device comprises:

a suction cup 200;

an air pump 400, connected to the suction cup 200 for pumping air and forming a negative pressure at the suction cup 200 to adsorb and fix the object to be fixed, wherein the object to be fixed is an electronic product.

In the present embodiment, the fixing device uses the air pump 400 to suck the air in the suction cup 200, so that the object to be fixed and the suction cup 200 are firmly fixed together, preventing the object to be fixed from falling off, and improving the stability and reliability of the fixing device.

Specifically, the fixing device further comprises: a holder body, wherein the holder body is provided with an accommodating cavity.

The holder body is used to support a mobile phone and relevant devices, and it may be understood that the holder could also be used to support smart mobile devices such as a tablet computer. The holder body is provided with the accommodating cavity for accommodating the corresponding functional devices.

In an embodiment, the holder body comprises: a panel 100 and a first housing 300, and the panel 100 and the first housing 300 form an accommodating cavity.

Specifically, the panel 100 is a circular flat plate. It could be understood that the panel 100 may be any other suitable shape such as a square shape. The first housing 300 is a hemispherical housing, and the first housing 300 and the panel 100 are connected by means of clamping to facilitate installation and disassembly. The first housing 300 and the panel 100 form a hemispherical cavity for accommodating devices such as the air pump and a circuit board.

Soft glue suction cup 200 is disposed on the other side of the panel 100 opposite to the accommodating cavity. The soft glue suction cup 200 and the panel 100 are respectively provided with matching openings.

Specially, the soft glue suction cup 200 is disposed outside the panel 100. The panel 100 is a circular panel. The circular panel is provided with a circular groove for accommodating the soft glue suction cup 200. The soft glue suction cup 200 and the panel 100 are provided with circular through holes with matching size, and the through holes are used for connecting to an air guiding tube 500.

In an embodiment, the soft glue suction cup 200 is a circular ring-shaped funnel shape, and the annular area of the soft glue suction cup 200 is soft glue, the funnel-shaped area of the soft glue suction cup 200 is hard glue, and the soft glue suction cup 200 is fixed to the panel 100 through the suction cup cover plate 210. The suction cup cover plate 210 could firmly fasten the soft glue suction cup 200 to the panel 100, so as to ensure that the soft glue suction cup 200 does not fall off. In the present embodiment, the annular area of the soft glue suction cup 200 is soft glue, and the funnel-shaped area of the soft glue suction cup 200 is hard glue, and the soft glue provides a sealing function, and the intermediate hard glue provides support, so as to increase the entire suction cup's area, thereby increasing the suction force of the soft glue suction cup under the same pressure.

In an embodiment, the suction cup cover plate 210 is further provided with a soft glue non-slip mat 212, and the soft glue non-slip mat 212 is provided with a single guiding pattern 2120. The soft glue non-slip mat 212 on the suction cup cover plate 210 could ensure: when the soft glue suction cup 200 is connected to the mobile phone, since the friction at the junction is increased, the mobile phone could be more firmly connected with the soft glue suction cup 200, preventing the mobile phone from falling off from the soft glue suction cup 200. In addition, since the soft glue non-slip mat 212 is provided with the single guiding pattern 2120, specifically, the single guiding pattern 2120 is an arrow shape in an upward direction. The single guiding pattern 2120 makes the mobile phone receive the largest friction when the mobile phone moves downward, a slightly smaller friction when the mobile phone moves toward left or right, and the smallest friction when the mobile phone moves upward, which is convenient for the user to take the mobile phone in the upward direction. It could effectively prevent the mobile phone from falling off from the holder and improve the reliability of the holder.

The air pump 400 is disposed in the accommodating cavity, and the air pump 400 is connected to the air guiding tube 500. The other end of the air guiding tube 500 is connected to the opening of the soft glue suction cup 200.

Specifically, in order to reduce the volume of the suction-cup type mobile phone holder, in an embodiment, the air pump 400 used is a miniature piezoelectric pump, which could effectively reduce the volume of the suction-cup type mobile phone holder. In addition, it could be understood that the air pump 400 used could also be a centrifugal pump, which has the advantages of low power consumption and low noise.

In the above embodiments, the mobile phone holder uses the air pump to suck the air in the soft glue suction cup, so that the mobile phone and the soft glue suction cup could firmly fix together, preventing the mobile phone from falling off, thereby improving the stability and reliability of the mobile phone holder.

In an embodiment, referring to FIG. 1-4, a mobile phone holder is provided, and the mobile phone holder further comprises:

a charging circuit board 600, wherein the charging circuit board 600 is disposed in the accommodating cavity.

Specifically, the charging circuit board 600 is circular ring shape and could be accommodated inside the first housing. The charging circuit board 600 has an air pump control function module for controlling relevant circuits to implement the wireless charging and the control function for the air pump. Specifically, the suction-cup type mobile phone holder is also provided with a sensor which could recognize whether or not a device is attached to the suction cup. An example of the working logic of the suction cup is as follows: when there is an external power supply for supplying power, the air pump in the suction-cup type mobile phone holder always remains in operation; When there is no external power supply for supplying power, and when the sensor recognizes that there is an object attaching to the suction cup for a certain time, for example: 1 second, then control the air pump in the suction-cup type mobile phone holder to start.

In an embodiment, the charging circuit board 600 is further provided with a USB interface 610, and the USB interface 610 extends outside the accommodating cavity. Specifically, the user could connect the suction cup holder and the power supply through the USB interface for charging. In addition, the suction-cup type mobile phone holder further comprises a battery. When the suction-cup type mobile phone holder detects that the external power supply is stopped, the whole device could be powered by the battery to prevent the mobile phone from falling off from the suction-cup type mobile phone holder, thereby improving the reliability of the holder.

The wireless charging transmitting coil 700 is disposed on a side of the panel 100 which is in the accommodating cavity and is electrically connected to the charging circuit board 600.

A magnetic conductive piece 620 is further disposed between the charging circuit board 600 and the wireless charging transmitting coil 700.

In order to allow the magnetic field energy emitted by the primary coil to act on the secondary coil as much as possible, the magnetic conductive piece 620 guides the magnetic flux of the primary coil. In addition, a magnetic field acts on the coil to generate a high-frequency current, and in the process, the coil itself also generates heat, and the heat will gather together if it is not effectively dissipated. Sometimes we feel that in the process of the wireless charging, the heat is very high, which is usually caused by the heat of the coil or the heat of the circuit board. In order to effectively dissipate the heat of the coil and the heat of the circuit board, a packaging method is usually used: completely packaging the coil, the magnetic piece, and the circuit board by a thermal conductive resin material through a low-temperature and low-pressure IC packaging process, which could effectively dissipate the heat and achieve good heat dissipation effect.

In an embodiment, referring to FIG. 1-4, a mobile phone holder is provided, and the first housing 300 of the mobile phone holder is further provided with an indicating light-guide ring 800, and the indicating light-guide ring 800 is electrically connected to the charging circuit board 600, used for indicating the current charging state. The above charging states comprise, but are not limited to, a fault indication, a charging voltage indication, a charging completion indication, and the like.

In an embodiment, the indicating light-guide ring 800 is an annular multi-color indicator light. Specifically, for example, a RGB indicator light indicates the current working state of the suction-cup type mobile phone holder to the user through different colors. It could be understood that the suction-cup type mobile phone holder could also comprise other auxiliary functional devices, for example, a buzzer, when the power of the suction-cup type mobile phone holder is lower than a certain threshold or there is other alarm state, will make a sound to prompt the user, so as to improve the user's satisfaction.

In the present embodiment, the mobile phone holder could indicate the current charging state by the indicating light-guide ring 800, which is convenient for the user to intuitively understand the working state of the mobile phone holder, thereby improving the user's satisfaction.

In an embodiment, referring to FIG. 1-4, a mobile phone holder is provided, and the first housing 300 of the mobile phone holder is further provided with a raised second housing 310, and the second housing 310 is provided with a fastener. Specifically, the fastener is used to fix the mobile phone holder to other devices, and the user could fix the suction-cup type mobile phone holder to different positions of an automobile through the fastener, so the use scene thereof is also more widely.

In an embodiment, the second housing 310 is provided with a cylindrical protrusion 312, and the cylindrical protrusion 312 is provided with a fastening nut 314, and the fastening nut 314 is in threaded connection with the cylindrical protrusion 312.

In an embodiment, a dustproof net 214 is disposed at the opening of the soft glue suction cup 200. The dustproof net 214 could be used to prevent the air pump 400 from inhaling dust and causing the air guiding tube 500 to be plugged. Specifically, the dustproof net 214 is disposed on the suction opening in the middle of the hard glue, to effectively prevent a foreign body from being sucked in.

In the present embodiment, through the fastening nut 314, the mobile phone holder could be fixed to different devices by the screw thread, which could facilitate the use.

The above description is only the preferred embodiments of the present application, and is not intended to limit the patent scope of the present application, and under the inventive concept of the present application, any equivalent structural transformation made by using the specification and the accompanying drawings of the present application, or direct/indirect application in other related technical fields are all included in the patent protection scope of the present application.

What is claimed is:

1. A fixing device, comprising:

a suction cup;

an air pump, connected to the suction cup, for pumping air and forming a negative pressure at the suction cup to adsorb and fix an object to be fixed, wherein the object to be fixed is an electronic product;

wherein the fixing device further comprises:

a housing, and the air pump is fixedly installed in the housing; the suction cup is disposed outside the housing, and the suction cup is connected to the air pump through an air guiding tube;

the suction cup is composed of a funnel-shaped member and an annular-shaped member surrounding an outside of the funnel shaped member, and the suction cup is fixed to an outside of the housing through a suction cup cover plate; and the suction cup cover plate is provided with a soft glue non-slip mat for increasing a friction between the suction cup and the object to be fixed, and the soft glue non-slip mat is provided with a single guiding pattern.

2. The fixing device according to claim 1, wherein the air pump is a miniature piezoelectric pump.

3. The fixing device according to claim 2, wherein the suction cup is a soft glue suction cup.

4. A mobile phone holder, comprising a fixing device, the fixing device comprising:

a suction cup;

an air pump, connected to the suction cup, for pumping air and forming a negative pressure at the suction cup to adsorb and fix an object to be fixed, wherein the object to be fixed is an electronic product;

wherein the mobile phone holder further comprises:

a charging circuit board, the charging circuit board is disposed in a housing, and the charging circuit board is provided with a USB interface, and the USB interface extends to an outside of the housing;

a wireless charging transmitting coil, the wireless charging transmitting coil is disposed at one side of the housing and electrically connected to the charging circuit board;

a magnetic conductive piece, the magnetic conductive piece is disposed between the charging circuit board and the wireless charging transmitting coil.

5. The mobile phone holder according to claim 4, wherein the outside of the housing is further provided with an indicating light-guide ring, and the indicating light-guide ring is electrically connected to the charging circuit board for indicating the current working state of the mobile phone holder.

6. The mobile phone holder according to claim 5, wherein an opening of the suction cup is provided with a dustproof net for filtering the inhaled air;

the housing is further provided with a cylindrical protrusion, and a fastening nut is sleeved on the cylindrical protrusion, and the fastening nut is in threaded connection with the cylindrical protrusion, which could fix the mobile phone holder.

* * * * *